(12) United States Patent
Wade

(10) Patent No.: US 7,120,247 B1
(45) Date of Patent: Oct. 10, 2006

(54) HEADBAND HAVING A PLURALITY OF INTERCHANGEABLE ATTACHMENTS FOR HOLDING A CELLULAR PHONE TO THE HEADBAND

(76) Inventor: Russell D Wade, 2395 Amber Hills Way, Monroe, GA (US) 30655

( * ) Notice: Subject to any disclaimer, the term of this patent is extended or adjusted under 35 U.S.C. 154(b) by 374 days.

(21) Appl. No.: 10/341,778

(22) Filed: Jan. 14, 2003

(51) Int. Cl.
*H04M 1/00* (2006.01)
(52) U.S. Cl. ............... 379/430; 379/449; 455/575.2
(58) Field of Classification Search ......... 379/430, 379/449, 440; 455/575.2
See application file for complete search history.

(56) References Cited

U.S. PATENT DOCUMENTS

| | | | |
|---|---|---|---|
| 1,447,969 A * | 3/1923 | Dietrich | 379/430 |
| 2,020,084 A | 11/1935 | Sidders | |
| 2,481,387 A | 9/1949 | Bonecutter | |
| 2,854,523 A | 9/1958 | Lewis | |
| 2,998,497 A | 8/1961 | May | |
| 3,225,147 A | 12/1965 | Dollinger | |
| 4,048,453 A * | 9/1977 | Seidel | 379/449 |
| 4,241,242 A | 12/1980 | Yeh et al. | |
| 4,367,378 A | 1/1983 | Jordan | |
| 4,881,256 A | 11/1989 | Malekos | |
| 5,233,650 A | 8/1993 | Chan | |
| 5,407,113 A | 4/1995 | Golliher | |
| 5,689,558 A * | 11/1997 | Osgood et al. | 379/430 |
| 5,706,345 A | 1/1998 | Allen | |
| 5,828,749 A * | 10/1998 | Brodskiy | 379/449 |
| 6,038,312 A | 3/2000 | Bromley | |
| 6,374,090 B1 | 4/2002 | Morales | |

FOREIGN PATENT DOCUMENTS

DE          004005783 A1 *  9/1991  .......... 379/430

* cited by examiner

*Primary Examiner*—Jefferey F. Harold
(74) *Attorney, Agent, or Firm*—Michael I. Kroll (57) ABSTRACT

The present invention 10 discloses a cell phone headband comprising a headband 12 and a fastener member 18 for the headband having alternate means of attaching 20 the cell phone 14 to the fastening member. The means 20 of attaching the cell phone 14 to the headband 12 uses either magnetism 22, hook and loop material 28 or a clip 32. The magnetic fastener has a magnet 22 on the insertable fastening element 18 holding the cell phone 14 in one of two ways. If the cell phone 14 case is metallic the magnetic fastening element will magnetically hold the cell phone or the user can elect to place a metal element 24 on the cell phone housing or cell phone case 38 or attach the metal element to the exterior surface of the cell phone or cell phone case 38. The other fastening method discloses either a receptacle 32 for inserting an existing button fastener 34 that comes with some phone cases or attached a piece of hook and loop material 28 to the exterior of the phone or phone case that mates with a mating hook and loop material fastener on one of the insertable fastening elements 18.

3 Claims, 12 Drawing Sheets

HEADBAND HAVING A PLURALITY OF INTERCHANGEABLE ATTACHMENTS FOR HOLDING A CELLULAR PHONE TO THE HEADBAND

BACKGROUND OF THE INVENTION

1. Field of the Invention

The present invention relates generally to headbands and, more specifically, to a cell phone headband comprising a headband and a plurality of slidably insertable fastening elements for the headband having alternate methods of attaching said cell phone to the slidably insertable fastening elements.

The present invention provides means for a cell phone user to attach a cell phone to the headband using one of the fastening elements providing hands free use of the cell phone. The insertable fastening elements provide means for holding the cell phone to the headband using either magnetism, hook and loop material or a clip.

The magnetic fastener having a magnet on the insertable fastening element holds the cell phone in one of two ways. If the cell phone battery case is metallic the magnetic fastening element will magnetically hold the cell phone or the user can elect to place a metal element on the cell phone housing or cell phone case or attach the metal element to the exterior surface of the cell phone or cell phone case. The difference between the two methods is that one method uses the existing configuration of the cell phone without any modification to the phone or case while the other places or attaches a metal element to the cell phone or case. In either method the object is to provide magnetic means for holding the cell phone to the headband insertable fastening element.

The other fastening methods use either a receptacle for inserting an existing button fastener that comes with some phone cases or attaches a piece of hook and loop material to the exterior of the phone or phone case that mates with a mating hook and loop material fastener on one of the insertable fastening elements.

A primary object of the present invention is to provide cell phone users with alternate means of attachment in the form of a plurality of insertable fastening elements that can be releasably attached to a headband and wherein the insertable fastening elements use components already present within the phone such as the battery case or button fastener to attach the cell phone to the insertable fastening element or attach a metal element or hook and loop material to the cell phone or case thereby providing means for attaching the cell phone to the mating insertable fastening element. With all of the aforementioned methods providing hands free use of the cell phone.

2. Description of the Prior Art

There are other headband devices designed for securing a communication device. Typical of these is U.S. Pat. No. 2,020,084 issued to Sidders on Nov. 5, 1935.

Another patent was issued to Bonecutter on Sep. 6, 1949 as U.S. Pat. No. 2,481,387. Yet another U.S. Pat. No. 2,854,523 was issued to Lewis on Sep. 30, 1958 and still yet another was issued on Aug. 29, 1961 to May as U.S. Pat. No. 2,998,497.

Another patent was issued to Dollinger on Dec. 21, 1965 as U.S. Pat. No. 3,225,147. Yet another U.S. Pat. No. 4,048,453 was issued to Seidel on Sep. 13, 1977. Another was issued to Yeh et al., on Dec. 23, 1980 as U.S. Pat. No. 4,241,242 and still yet another was issued on Jan. 4, 1983 to Jordan as U.S. Pat. No. 4,367,378.

Another patent was issued to Malekos on Nov. 14, 1989 as U.S. Pat. No. 4,881,256. Yet another U.S. Pat. No. 5,233,650 was issued to Chan on Aug. 3, 1993. Another was issued to Golliher on Apr. 18, 1995 as U.S. Pat. No. 5,407,113 and still yet another was issued on Jan. 6, 1998 to Allen as U.S. Pat. No. 5,706,345.

Another patent was issued to Bromley on Mar. 14, 2000 as U.S. Pat. No. 6,038,312. Yet another U.S. Pat. No. 6,374,090 was issued to Morales on Apr. 16, 2002.

U.S. Pat. No. 2,020,084

Inventor: Marie A. Sidders

Issued: Nov. 4, 1935

The invention relates to devices for facilitating the support of telephone handsets upon the head of the user in such a manner as to leave both hands free for other purposes.

U.S. Pat. No. 2,481,387

Inventor: Archie O. Bonecutter

Issued: Sep. 6, 1949

The invention relates to improvements in telephone holders, providing an improved form of telephone holder which will be positively attached to the receiver portion of a telephone hand set and includes a headband adapted to extend over a person's head for supporting the receiver directly over the ear.

U.S. Pat. No. 2,854,523

Inventor: Harriet H. Lewis

Issued: Sep. 30, 1958

The invention relates to a device for supporting a telephone hand set in operation position on the head of a user so as to leave their hands free for other purposes.

U.S. Pat. No. 2,998,497

Inventor: Martha T. May

Issued: Aug. 29, 1961

The invention relates to telephone hand sets with head support for a telephone which positions the receiver of a hand set adjacent one ear of the telephone user, positions the transmitter of the head set adjacent the mouth of the user and one which serves to maintain such positions of the receiver and transmitter during all movements of the users head.

U.S. Pat. No. 3,225,147

Inventor: Joseph Dollinger

Issued: Dec. 28, 1965

The invention relates to a hand set support that is foldable into a storage position along side the hand set when not in use.

U.S. Pat. No. 4,048,453

Inventor: Gustave Seidel

Issued: Sep. 13, 1977

The telephone handset supporting assembly employs a standard telephone headband, which goes over the user's head in a fashion as to be secure, yet comfortable. The headband can be molded as a one piece plastic element. On one side of the headband is a simple interlocking device by which a second part of the assembly can be coupled to the headband. The second part of the assembly is secured to the telephone earpiece and is a lightweight, durable, one-piece molded plastic component. The earpiece attachment member is attached to the telephone by unscrewing the telephone earpiece and inserting the earpiece section between the handle portion of the telephone handset and the removable earpiece. The plastic earpiece attachment member is made of a dimension which will in no way interfere with or damage the telephone, or in any way interact with or interfere with any electronic components of the telephone.

U.S. Pat. No. 4,241,242

Inventor: Hsu-Chieh Yeh et al.

Issued: Dec. 23, 1980

A telephone handset holder adapted to provide a user with maximum comfort when using a telephone without exerting force on the holder against his shoulder. The holder includes a curved member adapted for engagement over the back part of a person's neck, a handset clamp pivotally secured to the front end of the curved member through a sector member, and a leg member pivotally secured to the handset clamp. The holder can be used on either side of a user.

U.S. Pat. No. 4,367,378

Inventor: Arthur A. Jordan

Issued: Jan. 4, 1983

A telephone handset in combination with an elastic band attached thereto and forming an endless assembly which may be placed around a person's head so that the telephone handset need not be held by hand wherein the telephone unit comprises a transmitter, a receiver, and an intermediate body portion interconnecting the transmitter and the receiver, and wherein the telephone handset includes first fastening members and the elastic band includes second fastening members cooperating with the first fastening members to detachably secure the elastic band to the telephone handset and form the endless assembly. The fastening members are of plastic eye and hook formation.

U.S. Pat. No. 4,881,256

Inventor: George E. Malekos

Issued: Nov. 14, 1989

The invention provides a headband fastened by moveable ball and socket to a mounting ring attachable to the earpiece of a standard telephone handset. The ball affixed to the headband has an adjust tab on the rounded end which fits adjust receptacles in the base of the socket. The tab and receptacle arrangement allows a three-position positive adjustment of the handset position in relation to the headband. In a square-type attachment for modern rectangular telephone handsets, an embodiment designed for the purpose includes two holder frames, one for right ear use and one for left ear use through positioning of the socket holder. The headband and holder for rectangular handsets includes a three-position positive adjust ball and socket fitting and an opened frame yoke that supports the earpiece attachment frame in a manner which prevents interference with the plunger on and off switch of the telephone handset.

U.S. Pat. No. 5,233,650

Inventor: Dennis Chan

Issued: Aug. 3, 1993

A telephone handset support device comprising a resilient headband provided with earpads for engaging the ears of the use, and a clip detachably attached to one earpad. The clip detachably connects to the headband and a central opening allows sound from the speaker in the telephone earpiece to pass through the connection to the user's ear. The clip includes a pair of spaced resilient gripping arms which extend generally outwardly away from a base of the clip and towards one another to define a region into which the earpiece of a telephone handset can be placed such that the arms grip around that earpiece. A resiliently mounted lever is urged towards the base and bears on the end of the earpiece so as to press this against the base and together with the gripping arms retains the earpiece in the clip.

U.S. Pat. No. 5,407,113

Inventor: Clayton R. Golliher

Issued: Apr. 19, 1995

An over-the-head, hands-free phone holder comprising of an elongated strap with first and second ends each having a first adhesive fastener connected thereto, and second adhesive fasteners connected to the first and second ends of a telephone and/or phone receiver wherein the first adhesive fasteners respectfully mate with the second adhesive fasteners to secure the telephone about the head of the individual in a hands free relation. The adhesive fasteners are of hook and loop formation. The strap consists of a large oval hole conformed to fit over the rear, top portion of the head of an individual and a small oval hole which facilitates two modes of attachment to the telephone receiver. The phone holder strap is also fully adjustable to a variety of head sizes, and for use on the left or right ear of an individual, and adaptable for use on a variety of telephones and/or phone receivers.

U.S. Pat. No. 5,706,345

Inventor: James E. Allen

Issued: Jan. 6, 1998

An over the head hands free phone holder comprising an adjustable headband terminated on each end by pivotable rigid housings whose inner surfaces are terminated by resilient ear cushions similar to an audio headset. A phone holding housing has an opening at the lower end which accepts most portable phones. Opposing gripping fingers on the left and right sides of the phone holding housing help hold the phone in place. The opposing, non-phone housing contains a perforated wall to which the resilient ear cushion is attached. A mating inner sliding wall has matching perforations. When the inner wall slides in a downward direction, the holes are misaligned with respect to the non-sliding wall, thereby blocking unwanted ambient noise. The non-phone housing also contains a weight to balance and offset the weight of the phone located on the opposite side of the user's head.

U.S. Pat. No. 6,038,312

Inventor: Jonathan P. Bromley

Issued: Mar. 14, 2000

A new telephone supporting device for preventing cricks and cramps in the neck caused by holding a phone between the head and shoulder. The inventive device includes a headband having a generally inverted U-shaped configuration. A lower end has an elongated vertically disposed slot formed therethrough. A telephone clamp is adjustably coupled with respect to the headband. The telephone clamp includes a vertical portion having outwardly extending tab portions from opposite ends thereof A space between the tab portions is dimensioned for receiving a telephone therebetween. One of the tab portions has an adjustment screw extending therethrough for engaging the telephone when positioned therein. The adjustment screw has a gripping pad disposed on a free end thereof. The vertical portion has a screw extending inwardly therefrom for extending through the slot of the lower end of the headband. A nut engages the screw for locking the telephone clamp with respect to the headband.

U.S. Pat. No. 6,374,090

Inventor: William E. Morales

Issued: Apr. 16, 2002

An apparatus is provided that is a portable telephone handset holder having a clamp griping a portable telephone, wherein the clamp grips the sides of the portable telephone and a clipping means clipping the portable telephone onto an ear of a user and is attached to the clamp. When the handset holder is placed onto the user's ear, the receiver of the portable telephone is in direct proximity of the user's ear.

While these headband communication device supports may be suitable for the purposes for which they were designed, they would not be as suitable for the purposes of the present invention, as hereinafter described. The present invention provides a headband having a plurality of interchangeable attachments for holding a cellular phone to the headband to allow for hands free cellular phone operation.

The device of the present invention consists of a headband portion constructed of a flexible strip having a cushioning element, also a removable, flexible fastener member that provides a plurality of variations of fasteners including those using magnetic, button and hook and loop material. Each flexible fastener member attaches to a counterpart that is fixedly attached to a cellular phone for the coupling or attachment of said cell phone to the flexible member. The flexible, interchangeable member is housed within one end of the headband of the present invention and used as a hands free cell phone holding device. Another option for the holding of a cell phone to the headband of the present invention is having a fastener fixedly attached to the flexible member and its counterpart fixedly attached to a cell phone carrying case.

Another option of the present invention is the headband having a magnet fixedly attached to a flexible member and magnetically bonding to the battery unit of a cellular phone.

An additional element of the present invention includes having the headband separated into two separate sections that are pivotally connected so as to fold into a more compact area when not in use to provide enhanced portability thereof A locking mechanism is included to secure the headband sections together when in use.

SUMMARY OF THE PRESENT INVENTION

The present invention discloses a cell phone headband comprising a headband and a fastener member for the headband having alternate means of attaching the cell phone to the fastening member. The means of attaching the cell phone to the headband uses either magnetism, hook and loop material or a clip. The magnetic fastener has a magnet on the insertable fastening element holding the cell phone in one of two ways. If the cell phone case is metallic the magnetic fastening element will magnetically hold the cell phone or the user can elect to place a metal element on the cell phone housing or cell phone case or attach the metal element to the exterior surface of the cell phone or cell phone case. The difference between the two methods is that one method uses the existing configuration of the cell phone without any modification to the phone or case while the other places or attaches a metal element to the cell phone or case. In either method the object is to provide magnetic means for holding the cell phone to the insertable fastening element of the headband. The other fastening method discloses either a receptacle for inserting an existing button fastener that comes with some phone cases or attached a piece of hook and loop material to the exterior of the phone or phone case that mates with a mating hook and loop material fastener on one of the insertable fastening elements.

A primary object of the present invention is to provide a headband having a plurality of interchangeable attachments for holding a cellular phone to the headband to allow for hands free cellular phone operation.

Another object of the present invention is to provide a headband having a headband portion constructed of a flexible strip to ensure a secure comfortable fit to the users head and at least one cushioning element to alleviate the pressure applied thereto.

Yet another object of the present invention is to provide a headband having a removable, flexible fastener member that provides a plurality of fastening options including means utilizing magnetic, button and hook and loop material fastening means.

Still yet another object of the present invention is to provide a headband having a flexible fastener member that attaches to a counterpart that is fixedly attached to a cellular phone for the coupling or attachment of said cell phone to the flexible member.

Another object of the present invention is to provide a headband having a flexible, interchangeable member that is housed within one end of the headband of the present invention and used as a hands free cell phone holding device.

Yet another object of the present invention is to provide a headband having another option for the holding of a cell phone to the headband of the present invention having a fastener fixedly attached to the flexible member and its counter part fixedly attached to a cell phone carrying case.

Still yet another object of the present invention is to provide a headband having another option of the present invention with the headband having a magnet fixedly attached to a flexible member and magnetically bonding to the battery unit of a cellular phone.

Additional objects of the present invention will appear as the description proceeds.

The present invention overcomes the shortcomings of the prior art by providing a headband having a plurality of interchangeable attachments for holding a cellular phone to the headband to create a state of hands free cellular phone operation. The device of the present invention consists of a headband portion constructed of a flexible metal strip encompassed in a foam or rubber material and further encompassed in material such as leather or cloth, also a removable, flexible fastener member that provides three variations of fasteners, magnetic, button and hook and loop material. Each flexible fastener member attaches to a counter part that is fixedly attached to a cellular phone for the coupling or attachment of said cell phone to the flexible member. The flexible, interchangeable member is housed within one distal end of the headband of the present invention and used as a hands free cell phone holding device. Another option for the holding of a cell phone to the headband of the present invention is having a fastener fixedly attached to the flexible member and its counter part fixedly attached to a cell phone carrying case.

Another option of the present invention is the headband having a magnet fixedly attached to a flexible member and magnetically bonding to the battery unit of a cellular phone.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

With regard to reference numerals used, the following numbering is used throughout the drawings.

10 present invention
12 headband
14 cell phone
16 cushioning
18 fastener member
20 attachment means
22 magnet
24 metal plate
26 double faced tape
28 hook and loop material
30 hook and loop material
32 retaining clip member
34 button element
36 fastener
38 carrying case
40 magnet
42 inner member
44 outer material
46 cover
48 flexible headband member
50 lower member
52 upper member
54 pivot hinge
56 locking means
58 protrusion
60 recess
62 pivot knob

DETAILED DESCRIPTION OF THE PREFERRED EMBODIMENT

The following discussion describes in detail one embodiment of the invention. This discussion should not be construed, however, as limiting the invention to those particular embodiments since practitioners skilled in the art will recognize numerous other embodiments as well. For a definition of the complete scope of the invention, the reader is directed to the appended claims.

Figure 1:
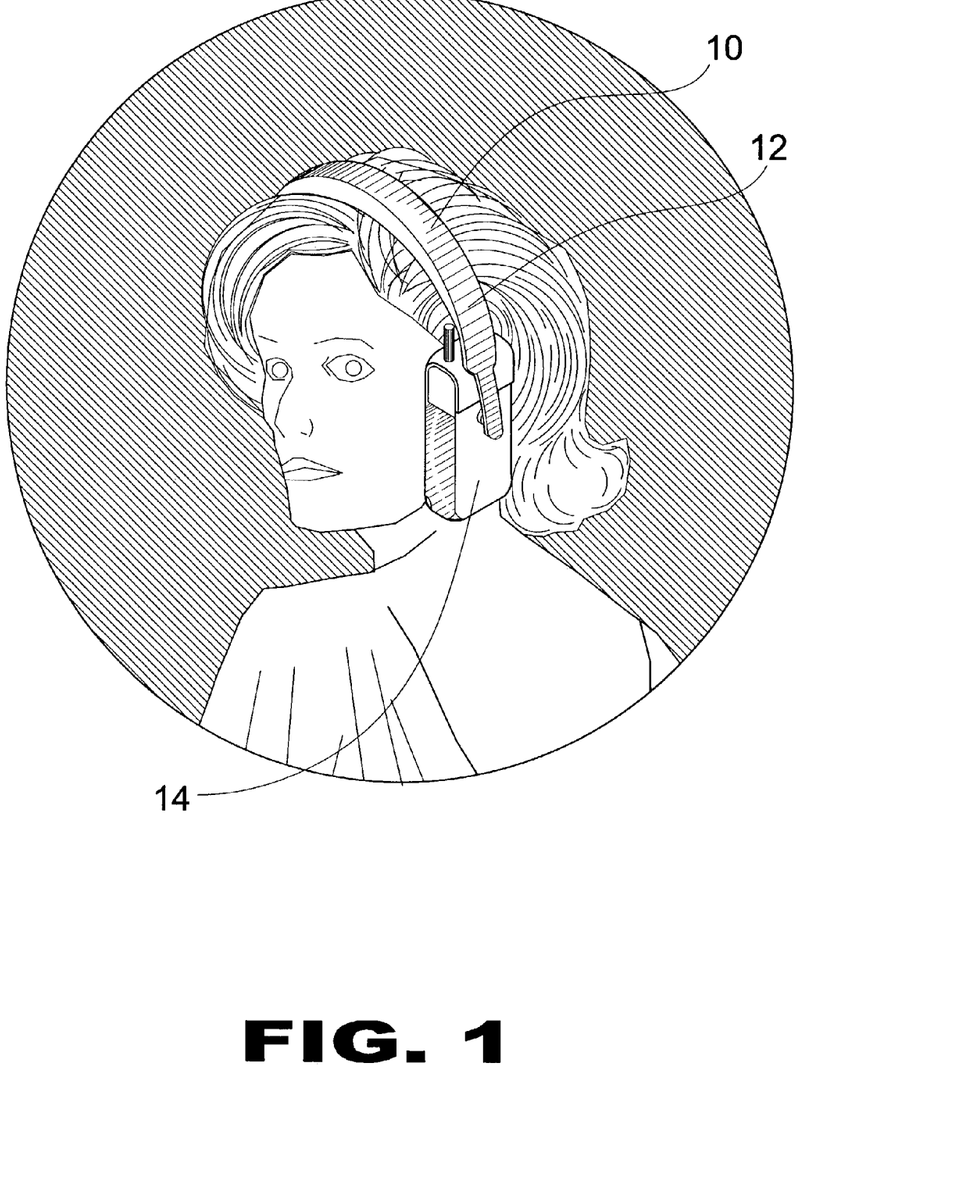
FIG. 1 is a perspective view of the present invention.

Turning to FIG. 1, shown therein is a perspective view of the present invention 10. The present invention 10 discloses a headband 12 having a plurality of swappable attachments including magnetic, hook and loop material and button means for holding a portable telephone, e.g., a cellular phone 14, or the like, to a headband 12 by attaching a fastening element to a cellular phone 14 and having a complementary fastening element attached to a headband 12 providing 'hands free' cellular operation with no dangling wires.

Figure 2:
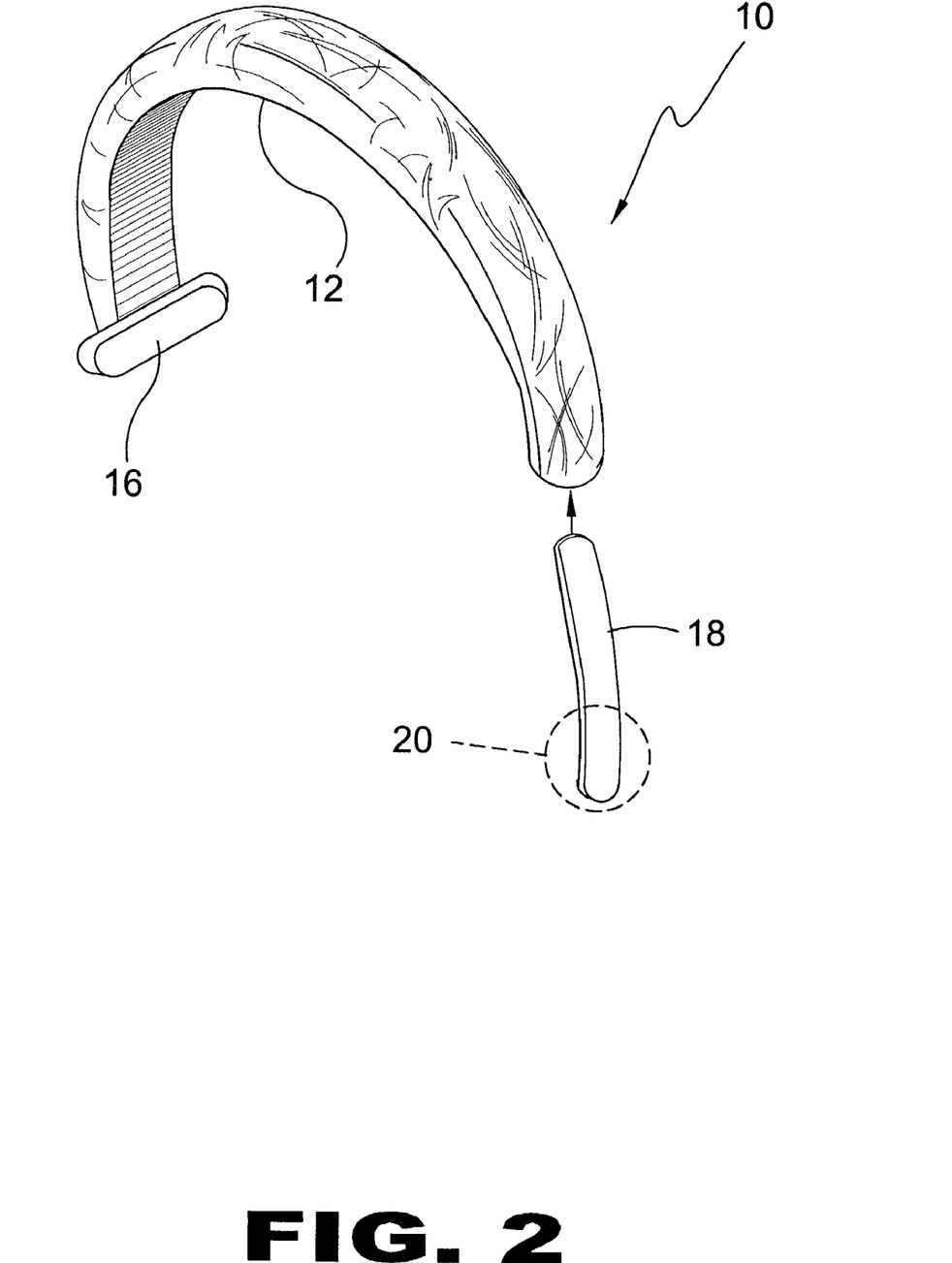
FIG. 2 is an exploded view of the present invention.

Turning to FIG. 2, shown therein is an exploded view of the present invention 10. The present invention 10 discloses a headband 12 having a plurality of swappable attachments consisting of a headband portion 12 which may be cushioned at 16 and removable fastener members 18 having a plurality of embodiments that provide the user with a means for attaching 20 to a plurality of cellular phone styles.

Figure 3:
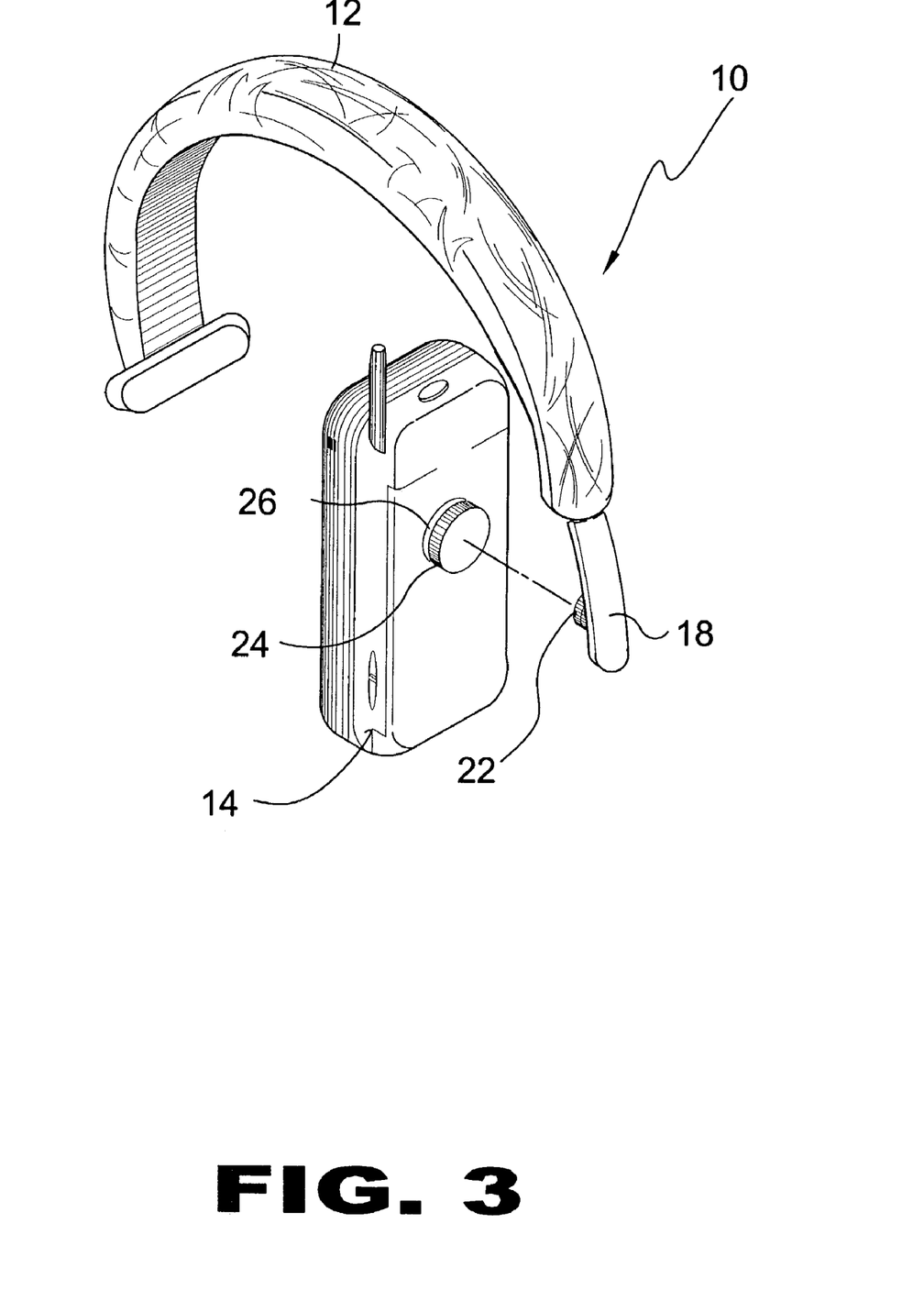
FIG. 3 is a perspective view of a first swappable attachment of the present invention.

Turning to FIG. 3, shown therein is a perspective view of a first swappable attachment means of the present invention 10. The present invention 10 discloses a headband 12 having a plurality of swappable attachments consisting of a headband portion 12 and a removable fastener member 18 that is provided in several different fastener styles. The first style includes a flexible fastener member 18 providing a magnetic fastener 22 that is fixedly attached to the flexible member 18 along with a counter part being a metal plate 24 secured to the cellular phone 14 with double-faced tape 26.

Figure 4:
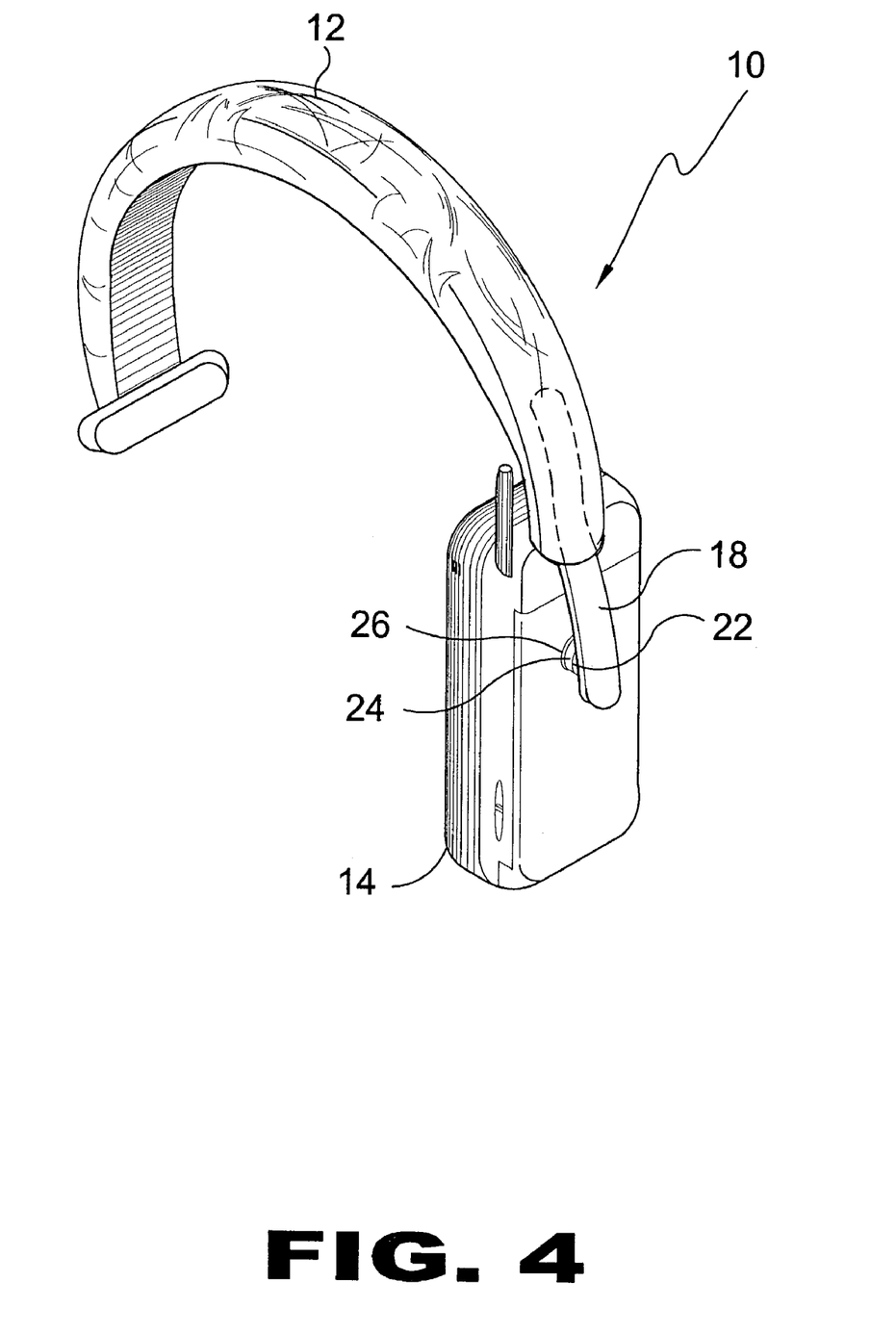
FIG. 4 is a perspective view of the first swappable attachment having a phone attached thereto.

Turning to FIG. 4, shown therein is a perspective view of the first swappable attachment means having a cell phone 14 attached thereto. Shown is the present invention 10 with fastener member 18 using the swappable attachment with magnetic fastening element 22, metal plate 24, and tape 26 so that the phone 14 is magnetically secured to the headband 12 and ready for use.

Figure 5:
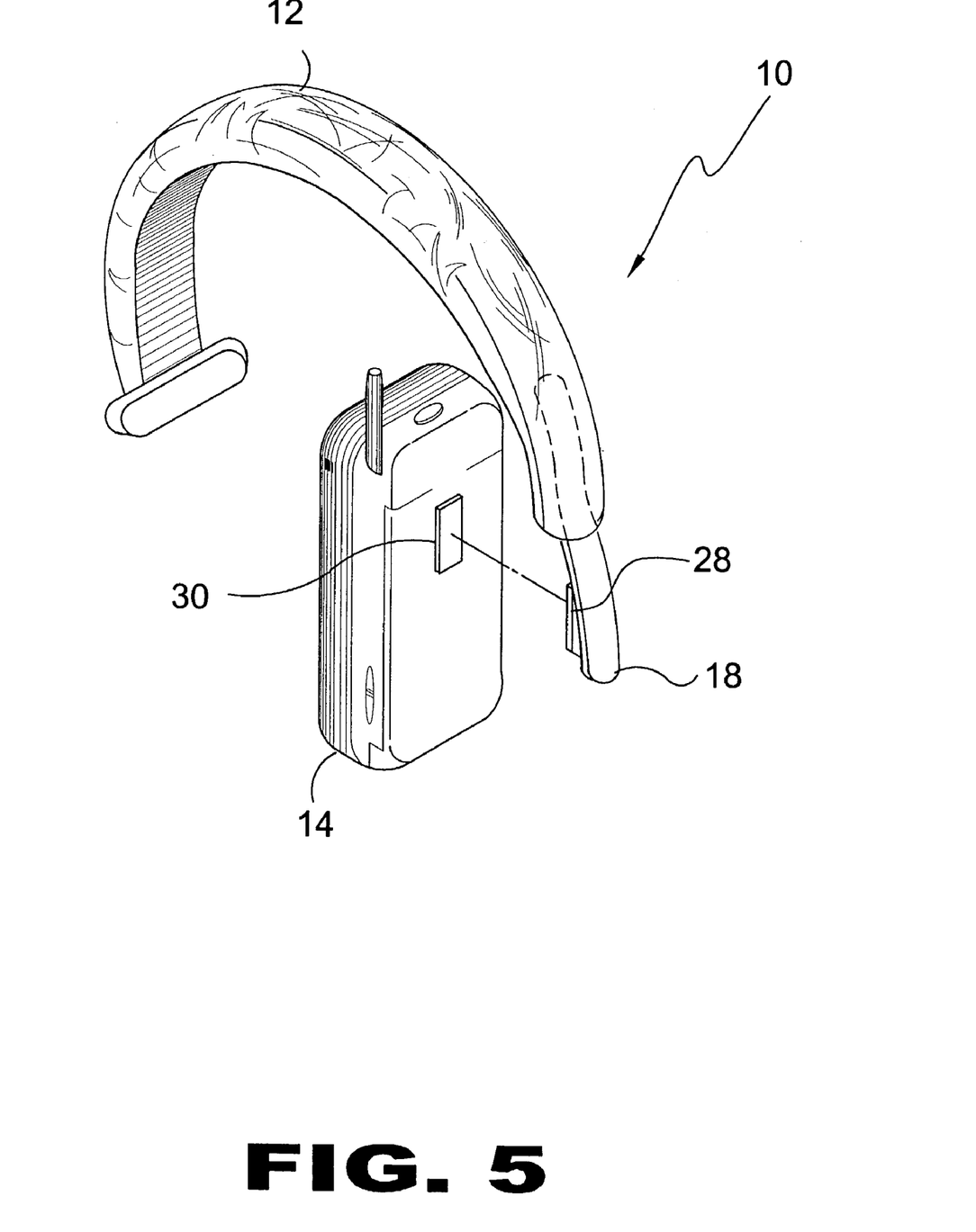
FIG. 5 is a perspective view of a second swappable attachment of the present invention.

Turning to FIG. 5, shown therein is a perspective view of a second swappable attachment means of the present invention 10. Shown is the present invention 10 with headband 12 with one element of a hook-and-loop fastener 28 attached to the flexible member 18 and a mating hook and loop fastener 30 attached to the cellular phone 14 intended to be used.

Figure 6:
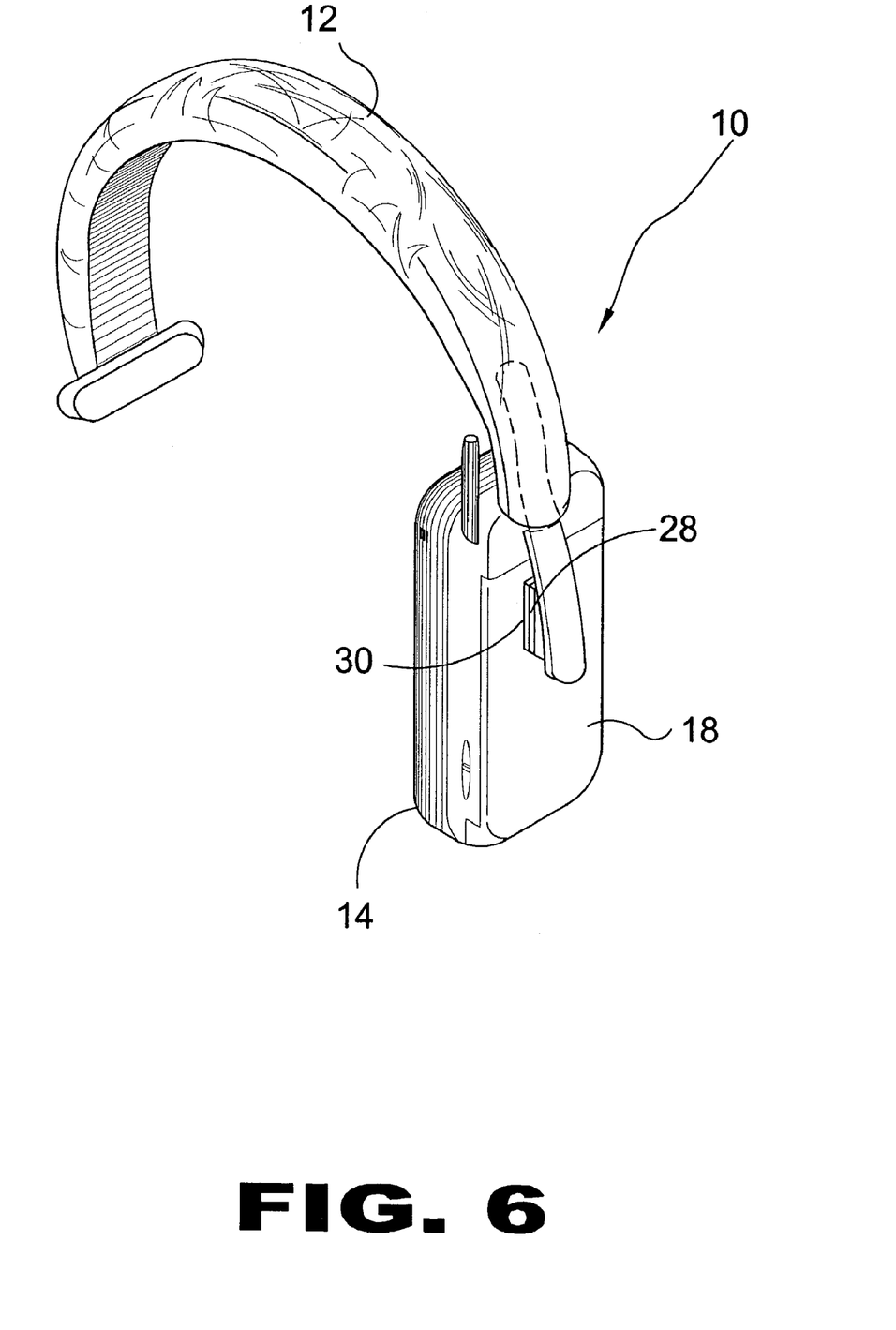
FIG. 6 is a perspective view of the second swappable attachment having a phone attached thereto.

Turning to FIG. 6, shown therein is a perspective view of the second swappable attachment means of the present invention 10 having a phone 14 attached thereto. Shown is one hook and loop fastener adapter 28 in use with a cellular phone 14 with the phone 14 removably attached to the flexible adapter member 18 by means of the second mating hook-and-loop fastening element 30.

Figure 7:
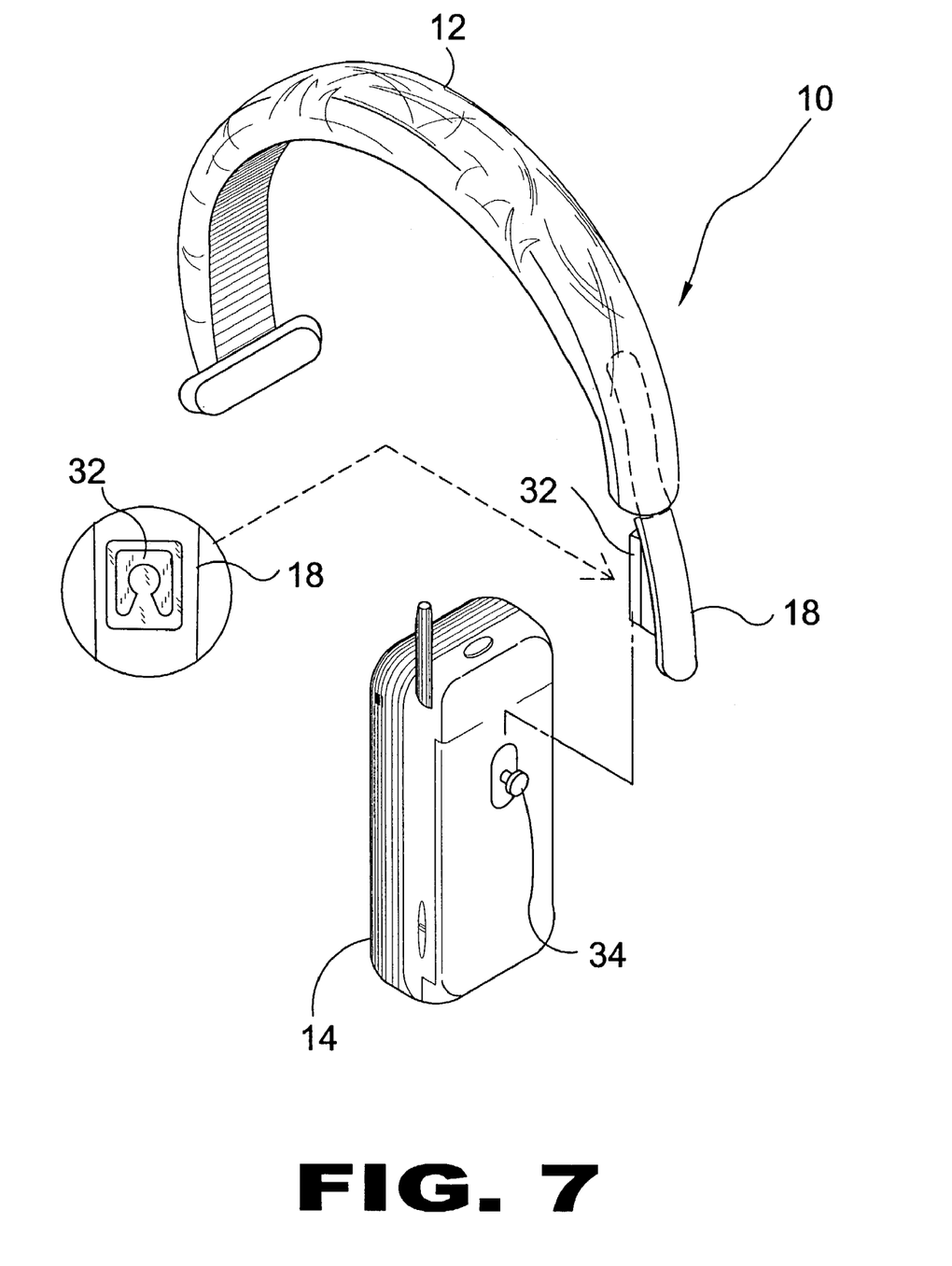
FIG. 7 is a perspective view of a third swappable attachment of the present invention.

Turning to FIG. 7, shown therein is a perspective view of a third swappable attachment of the present invention 10. Shown is a view of the present invention 10 disclosing a headband 12 having a plurality of swappable attachments comprising a headband portion 12 and a removable fastener member 18 that is provided in a plurality of different fastener styles including one comprising a flexible member 18 providing a retaining clip member 32 to retain a protruding button element 34 integral with existing cellular phones 14. This method may also be adapted to accommodate phones that have an existing integrally formed retaining recess to accept a retaining button therein.

Figure 8:
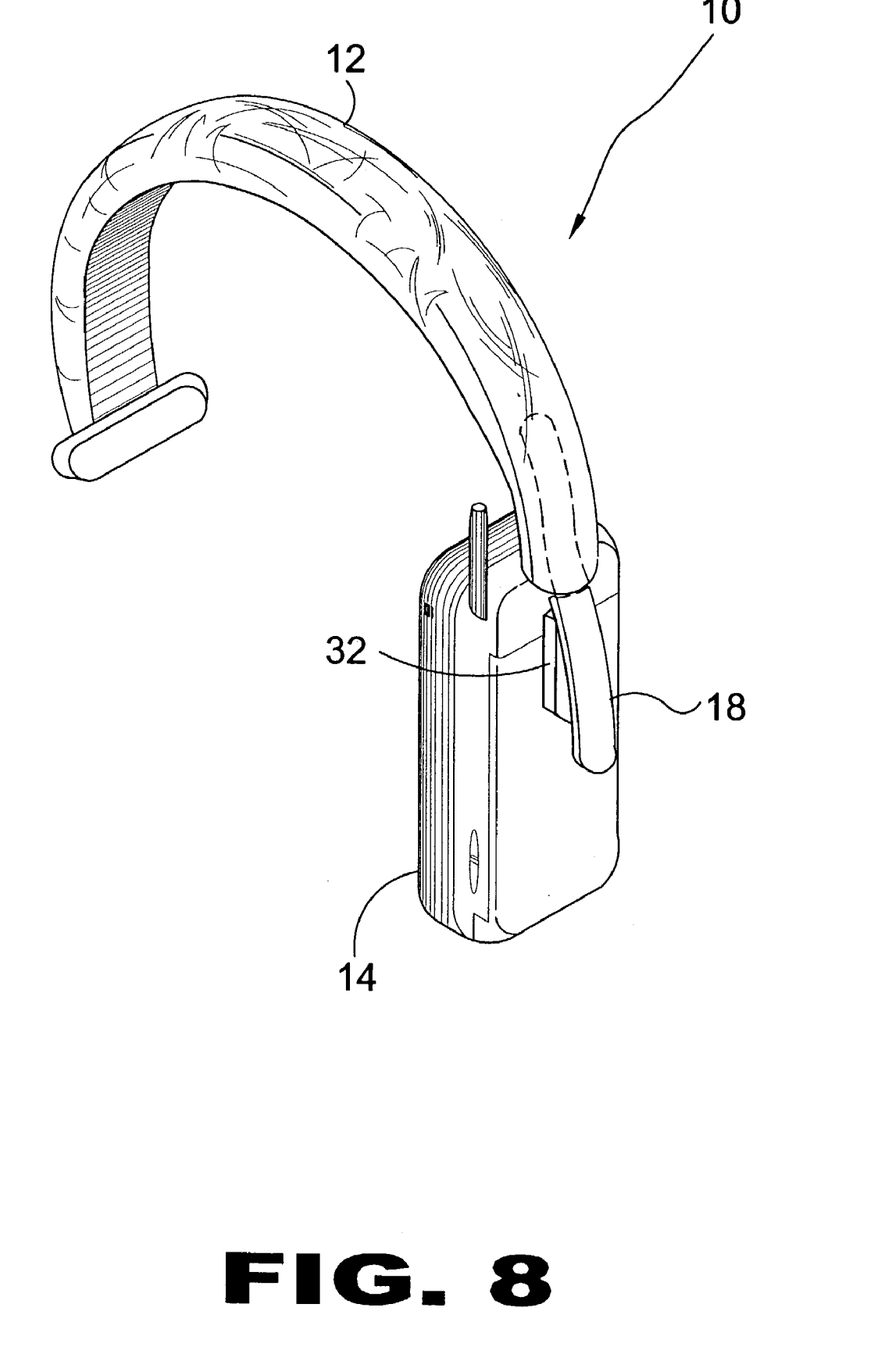
FIG. 8 is a perspective view of the third swappable attachment having a phone attached thereto.

Turning to FIG. 8, shown therein is a perspective view of the third swappable attachment means of the present invention 10 having a phone 14 attached thereto. Shown is the present invention 10 with the cellular telephone 14 having an integral retaining button element that is removably secured to the retaining clip member 32 on the adapter member 18.

Figure 9:
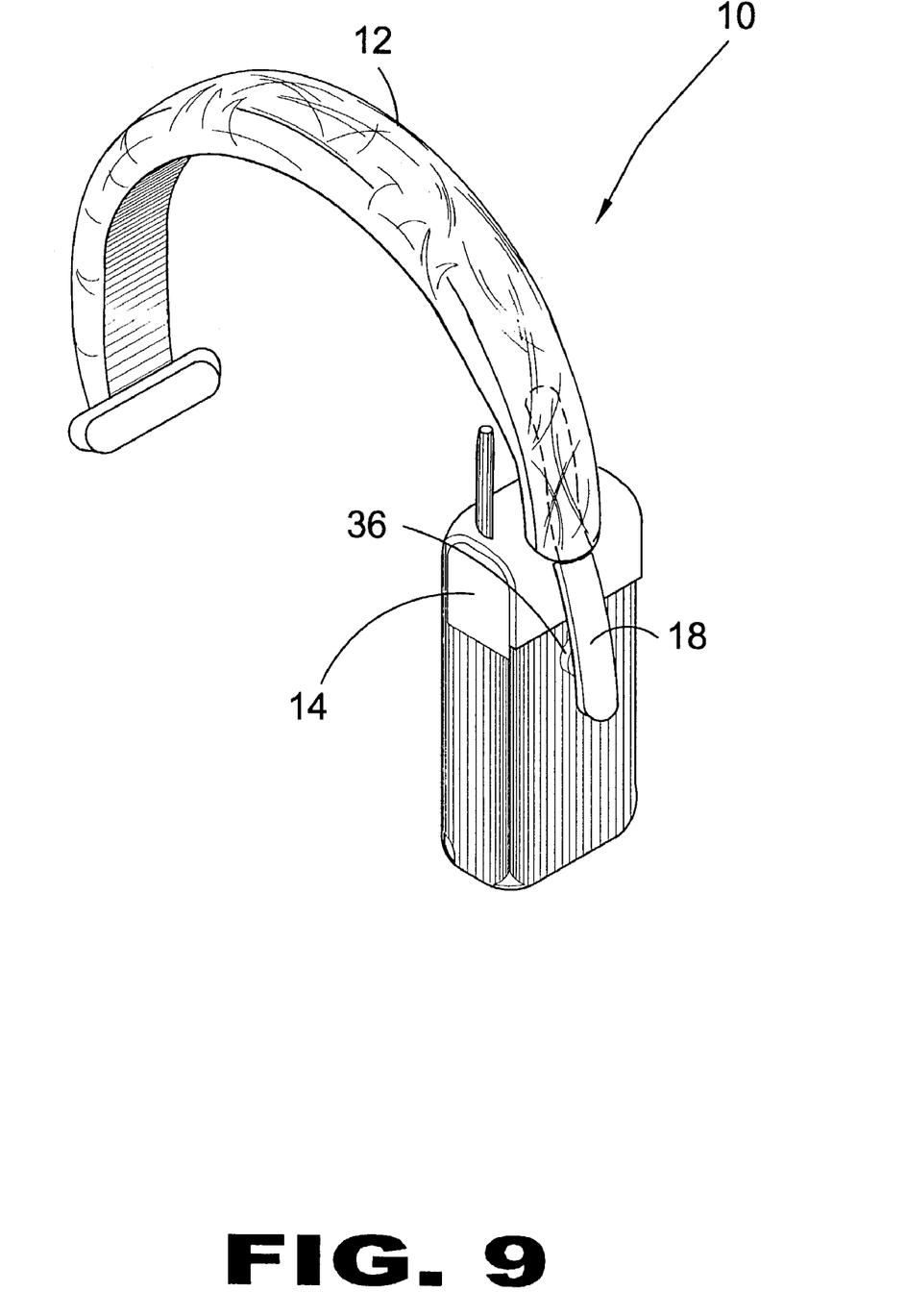
FIG. 9 is a perspective view of the present invention.

Turning to FIG. 9, shown therein is a perspective view of the present invention 10. Shown is an optional means of attachment of the present invention 10 including a headband 12 having a fastener 36 fixedly attached to the flexible member 18 and its counterpart fixedly attached to a cell phone 14 carrying case 38.

Figure 10:
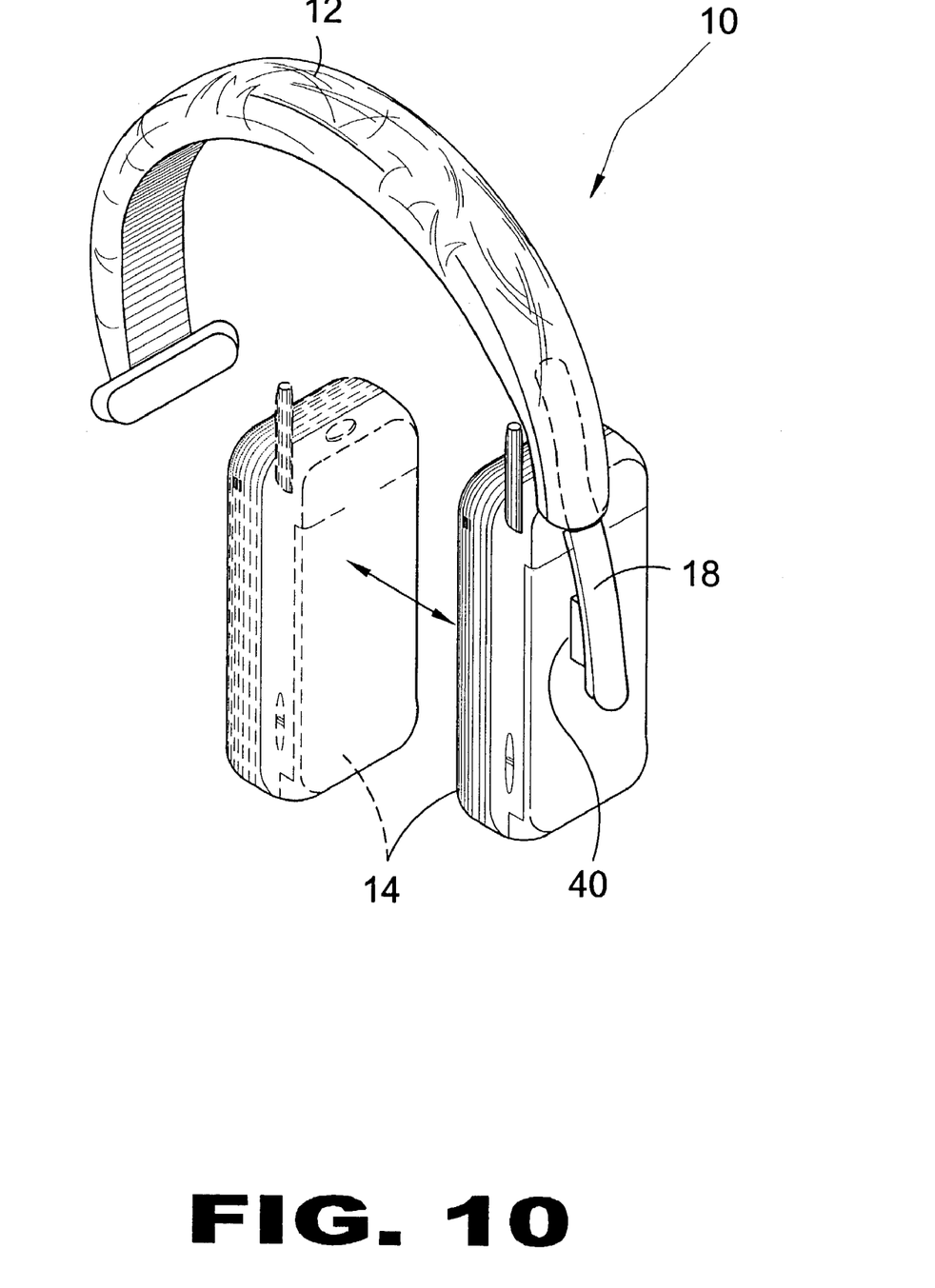
FIG. 10 is a perspective view of the present invention.

Turning to FIG. 10, shown therein is a perspective view of the present invention 10. Shown is another optional means of attachment of the present invention 10 including a headband 12 having a magnet 40 fixedly attached to the flexible member 18 that magnetically bonds to the metallic housing of a cellular phone 14.

Figure 11:
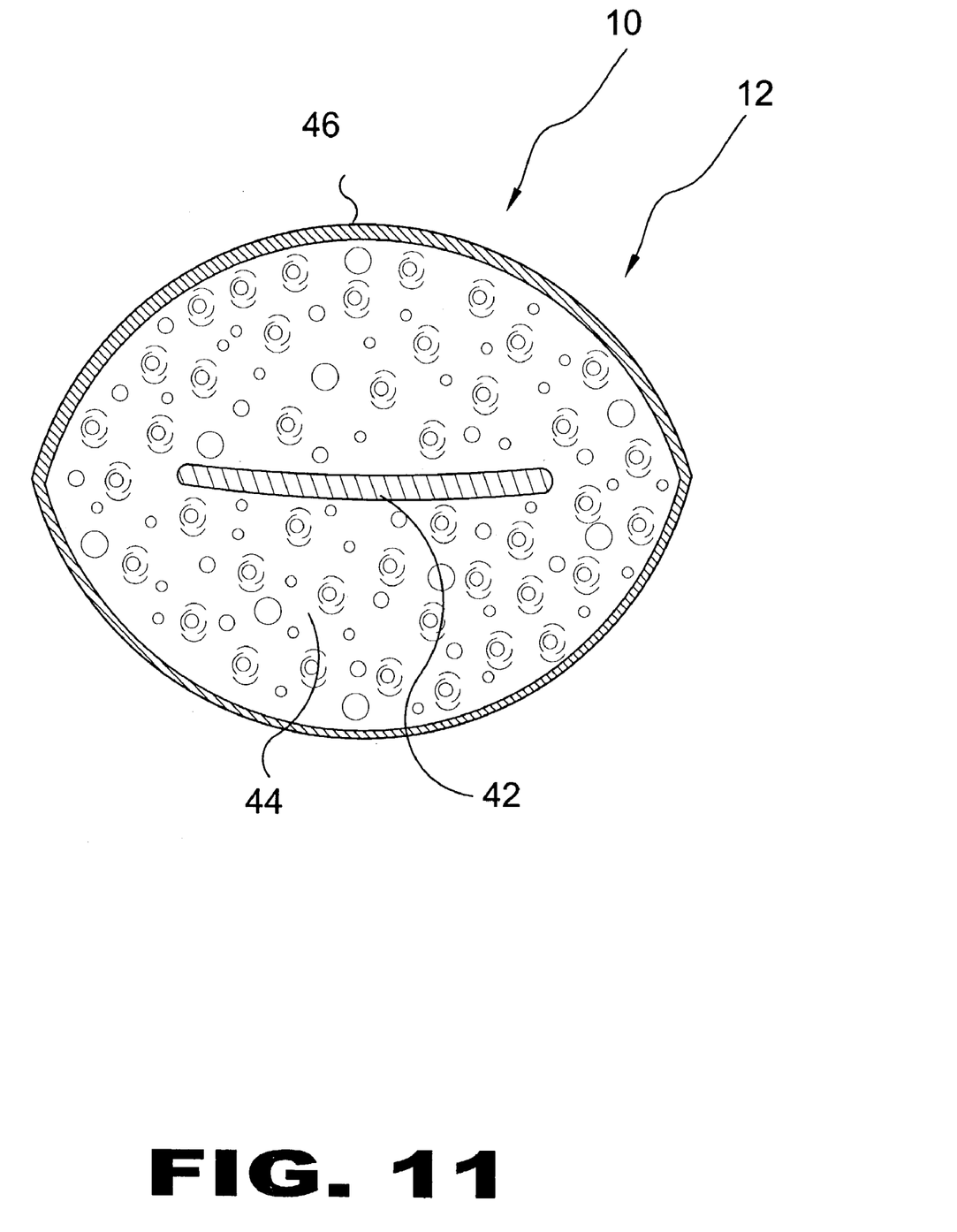
FIG. 11 is a sectional view of the present invention.

Turning to FIG. 11, shown therein is a sectional view of the present invention 10. Shown is a sectional view of the headband 12 of the present invention 10. The inner flexible metal or like member 42 is encompassed by a foam or rubber material 44 that is confined within an outer cover material 46 such as leather or textile. The present invention 10 may comprise any suitable material or materials that help to achieve the objectives of the present invention such as a molded plastic with a cushion on the inside edge of the band and a cushion on the opposite side from the phone and above the ear.

Figure 12:
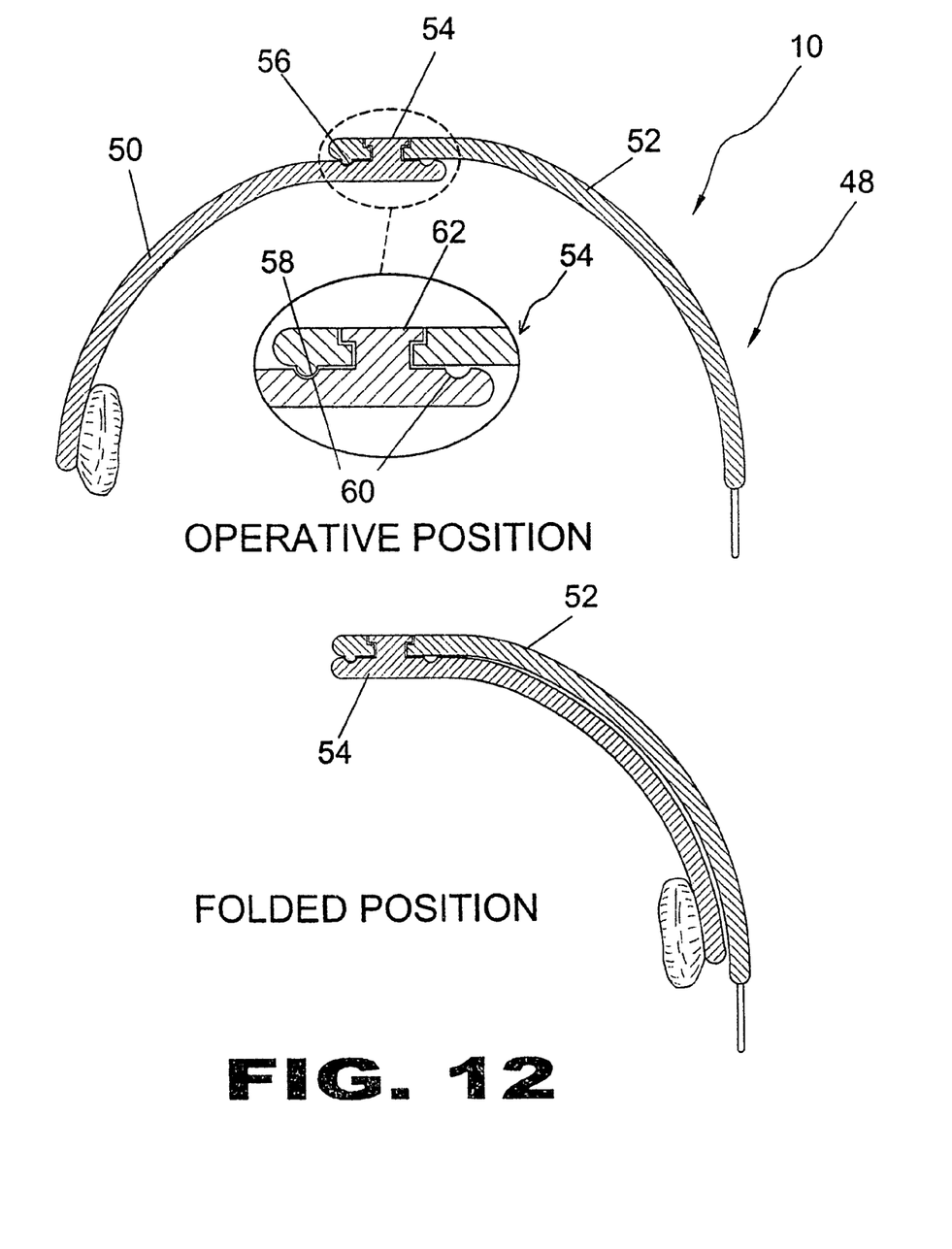
FIG. 12 is a partial sectional front view of the present invention with folding capabilities.

Turning to FIG. 12, shown therein is a partial sectional front view of the present invention 10 with folding capabilities. The flexible headband member 48 of the present invention 10 may also be designed in two sections being a lower 50 and upper 52 with a central pivoting means 54 to allow the user to fold the unit 48 into a more compact form when not in use for easy storage. A locking means 56 is also included to maintain the headband 48 in the operative position until released by the user. Shown is a pivoting means 54 with a snap-in locking means 56 with a pivot knob 62 having a dimpled protrusion 58 extending from the underside of the upper section 52 of the headband 48 and locked into a corresponding dimpled recess 60 on the top side of the lower section 50.

I claim:

1. An apparatus for attaching a cellular telephone to a headband for being worn on the head of a user to allow a user to converse on the cellular telephone, comprising:
   a) a headband adapted to be worn over a top of the head of a user, said headband having a first end and a second end, wherein said headband is flexible;
   b) said headband being hollow and having one of a plurality of slidable and interchangeable fastening members extending out of said first end and adjustable to have a distal end thereof terminate over an ear of said user, and said second end of said headband adapted to terminate above an opposite ear of said user;
   c) a cellular telephone removably disposed on said distal end of said interchangeable fastening member and a cushion member mounted on the second end of said headband; and,
   d) each of said fastening members having a different type of means for attaching said cellular telephone to said headband whereby the telephone is removably attached to the headband and can be used by the user in a hands free manner;
   e) one of said fastening members has attaching means comprising a magnet disposed on said distal end of said fastening member, a magnet disposed on said cellular telephone, and double faced tape connecting said metal plate to said cellular telephone to permit the telephone to be attached to the headband;
   f) another of said fastening members has attaching means comprising a first piece of hook and loop material disposed on said distal end of said fastening member and a second piece of mating hook and loop material disposed on said cellular telephone to permit the telephone to be joined to the headband; and
   g) another of said fastening members has attaching means comprising a retaining clip member being disposed on said distal end of said fastening member, said clip member having a recess therein, a button member being disposed on said cellular telephone and wherein said recess of said retaining clip member receives said button member on said telephone to permit the telephone to be joined to the headband.

2. The apparatus of claim 1, wherein the magnet disposed on said cellular telephone is a magnetic metallic housing for said cellular telephone.

3. The apparatus of claim 1, wherein the magnet disposed on said cellular telephone is on a carrying case for said cellular telephone.

* * * * *